J. A. NORTON.
IRRIGATING APPARATUS.
APPLICATION FILED DEC. 2, 1915.
1,197,534.
Patented Sept. 5, 1916.
4 SHEETS—SHEET 3.
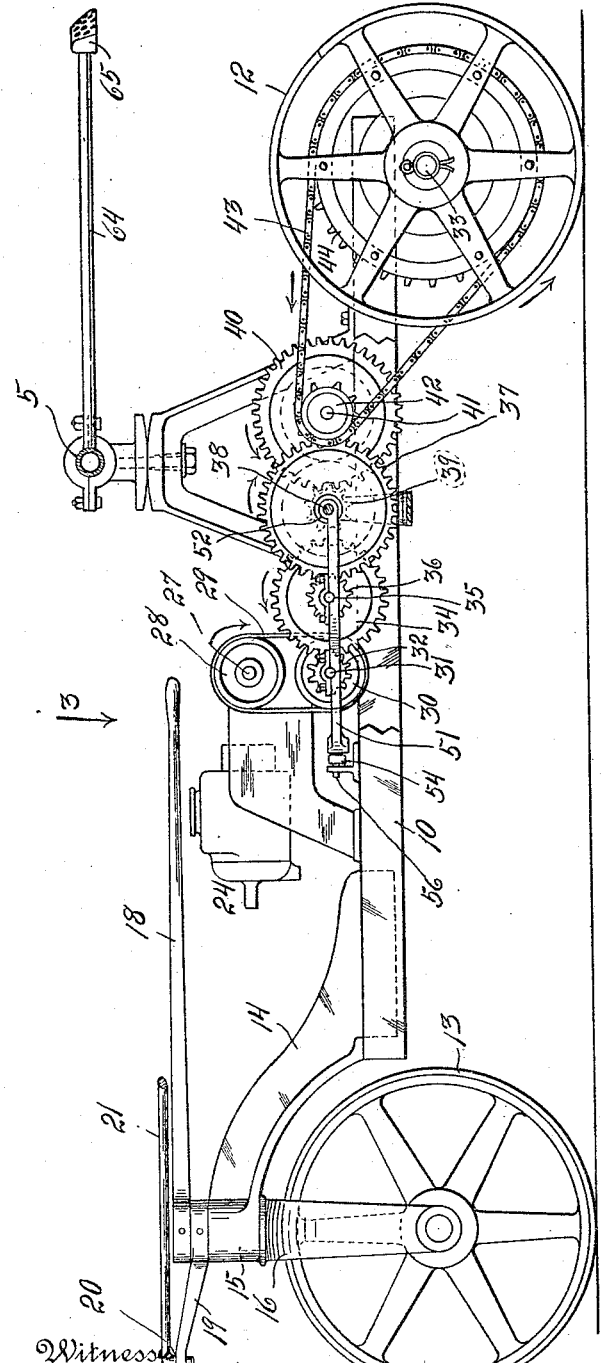
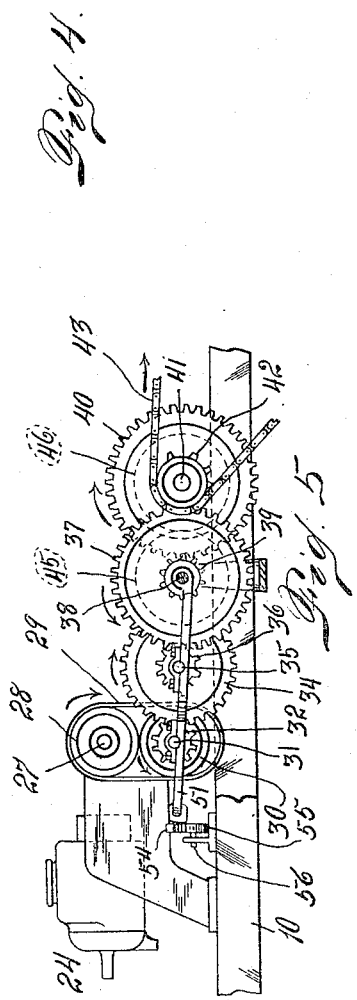
Witnesses
Otto E. Hoddick.
F. A. Van Rossem.
Inventor
James A. Norton.
By
Attorney

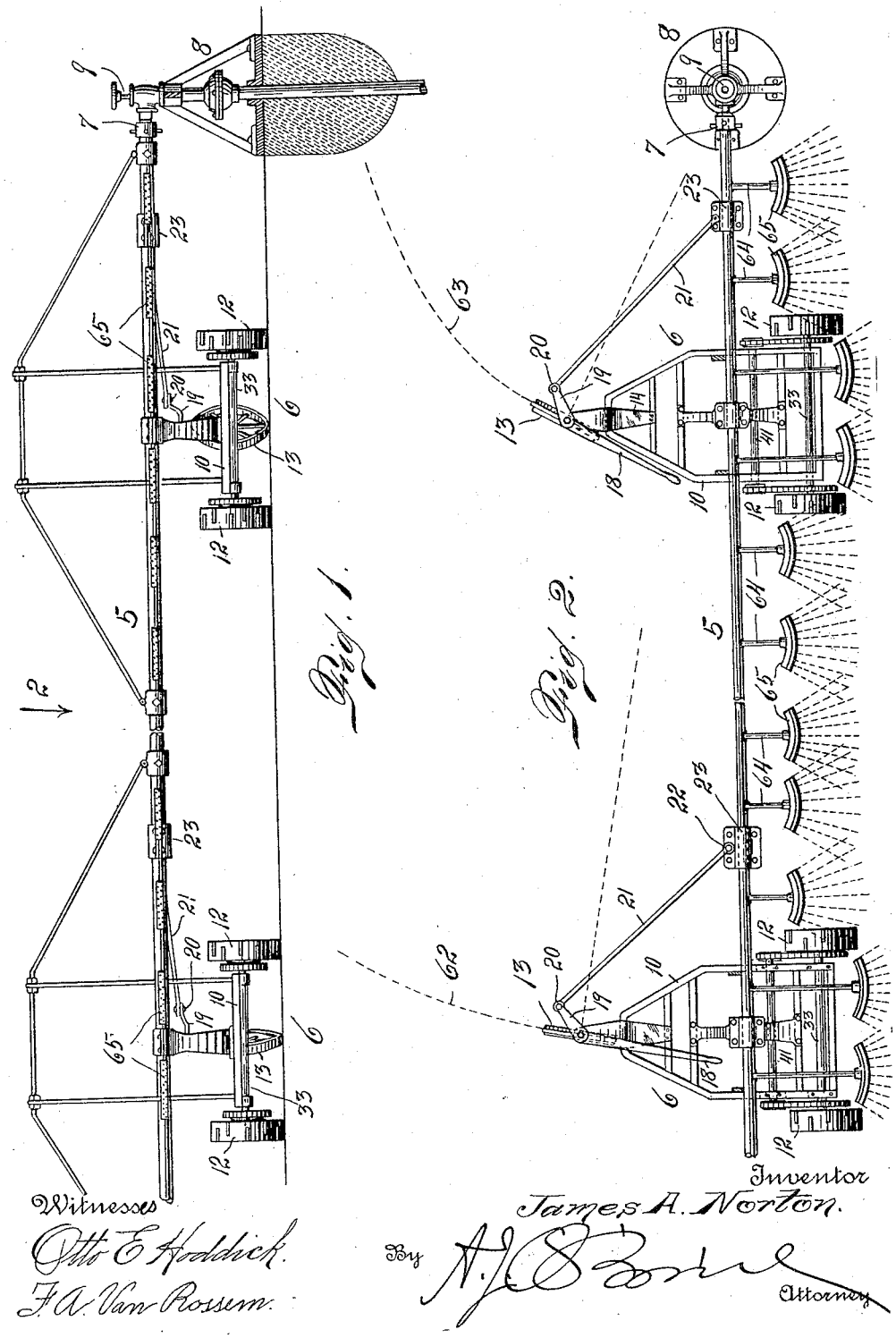

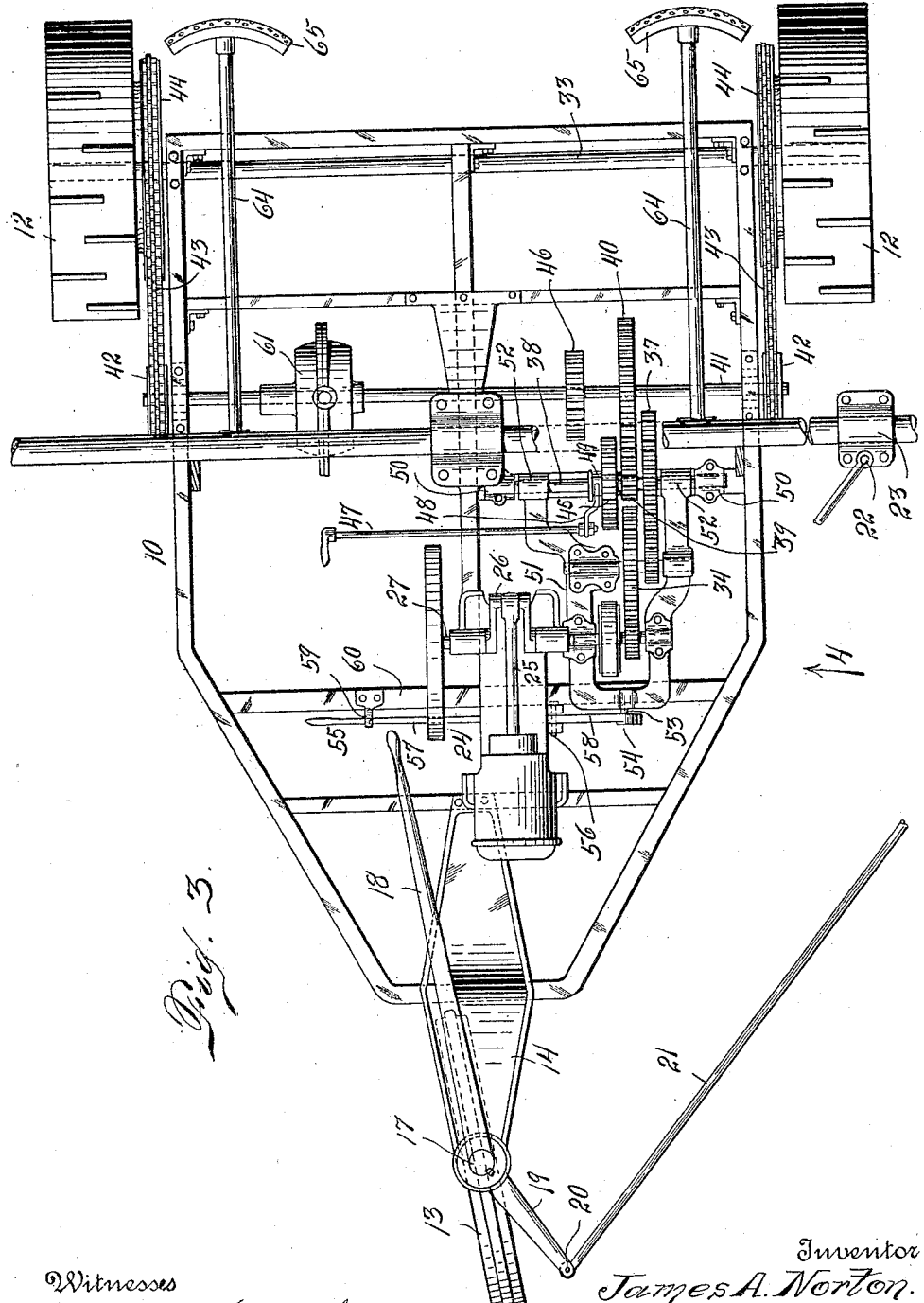

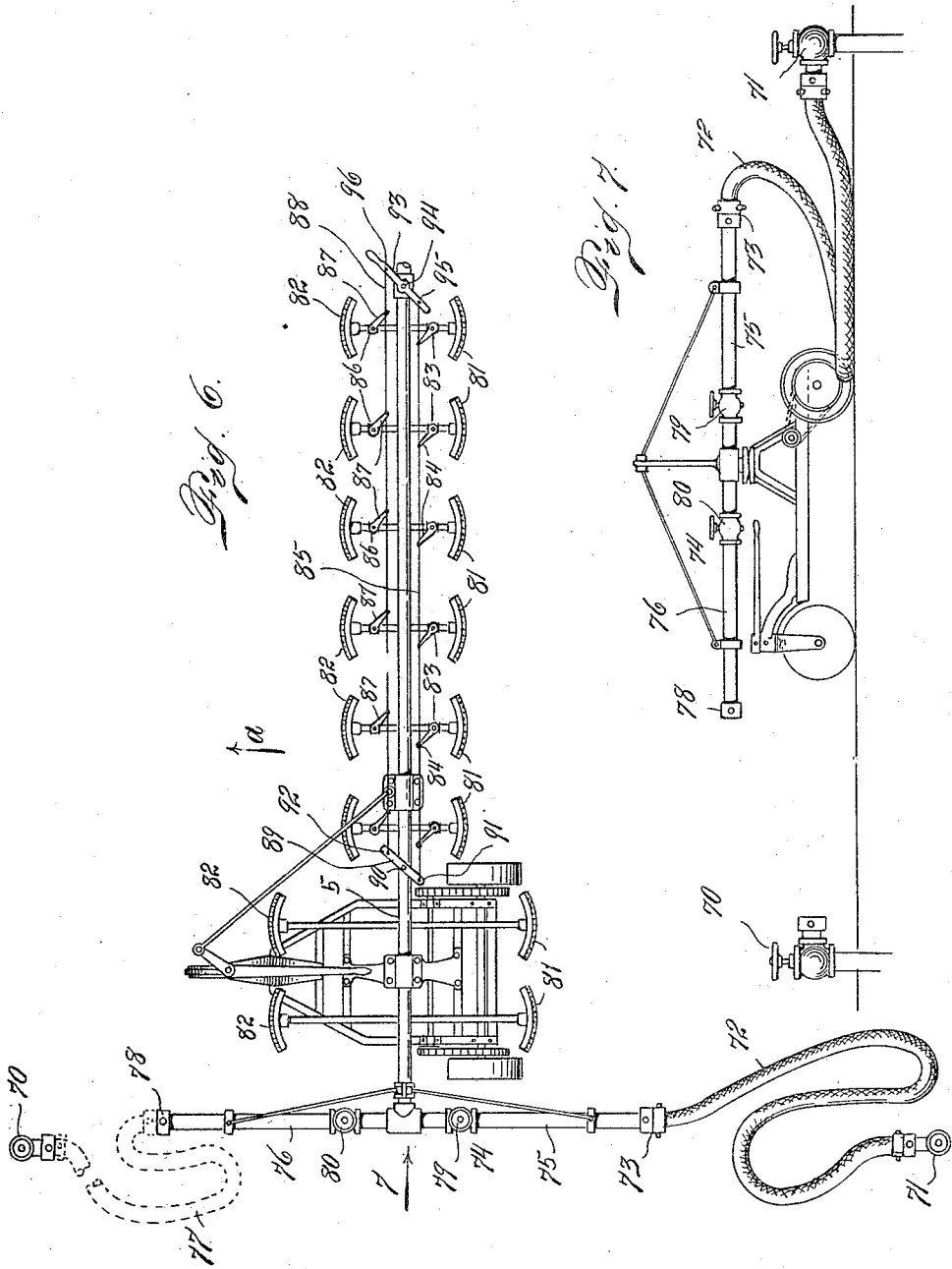

UNITED STATES PATENT OFFICE.

JAMES A. NORTON, OF ODEBOLT, IOWA, ASSIGNOR OF ONE-HALF TO CHARLES ESCHER, JR., OF BOTNA, IOWA.

IRRIGATING APPARATUS.

1,197,534.  Specification of Letters Patent.  Patented Sept. 5, 1916.

Application filed December 2, 1915. Serial No. 64,666.

*To all whom it may concern:*

Be it known that I, JAMES A. NORTON, a citizen of the United States, residing at Odebolt, county of Sac, and State of Iowa, have invented certain new and useful Improvements in Irrigating Apparatus; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in irrigating apparatus, my object being to provide a machine adapted to irrigate relatively large tracts of ground, from a central source or hydrant around which the machine travels, the hydrant being located in the center of the irrigating area.

The machine includes a conduit operably connected with the hydrant whereby the water under pressure from the source, enters the conduit and is discharged through a series of nozzles suitably spaced and so arranged as to properly irrigate the entire circular area over which the machine travels. This conduit is supported by a number of tractor units and may be of any desired length, the number of tractor units being increased as the length of the conduit increases. This apparatus could be used to irrigate rectangular areas of ground by employing a flexible hose connected with the hydrant and of sufficient length to allow the machine to travel over the predetermined area to be irrigated.

The power for operating the machine preferably consists of internal combustion engines or motors mounted on the respective tractor units.

Having briefly outlined my improved construction, I will proceed to describe the same in detail, reference being made to the accompanying drawing, in which is illustrated an embodiment thereof.

In this drawing Figure 1 is an elevation of my improved machine shown connected with a hydrant, the machine being broken away at its extremity remote from the hydrant, to indicate that it may be of any desired length. Fig. 2 is a top plan view of the same, or a view looking in the direction of arrow 2, Fig. 1. Fig. 3 is a top plan view of one of the tractor units shown on a larger scale, being a view looking in the direction of arrow 3, Fig. 4. Fig. 4 is a side elevation of a tractor unit or a view looking in the direction of arrow 4, Fig. 3. Fig. 5 is a detail view of the gearing employed in transmitting the power of the engine to the rear axle of a tractor unit, the mechanism being shown in position for rearward travel. Fig. 6 is a top plan view of the apparatus illustrating a modified form of construction. Fig. 7 is an end view of the same, or a view looking in the direction of arrow 7, Fig. 6.

The same reference characters indicate the same parts in all the views.

Let the numeral 5 designate a conduit mounted on a number of tractor units 6, one extremity of the conduit being connected by means of a coupling 7 with a hydrant 8. The hydrant is provided at the top with a valve 9 through the medium of which the water may be turned on or off as may be desired.

Each tractor unit consists of a frame 10 supported by rear wheels 12 and a forward steering wheel 13, the frame being suitably connected with the rear axle which is carried thereby. The forward extremity of the frame is reduced in width and is provided with an upwardly curved casting member 14 having a vertically disposed hub 15 in which is journaled a post 17 connected at its lower extremity with a forked member 16 whose arms extend on opposite sides of the steering wheel 13, the said wheel having journals engaging said arms. The wheel 13 may be moved for steering purposes through the medium of a lever arm 18 one extremity of which is secured to the top of the post 17, while its other extremity extends rearwardly whereby it is accessible to the person in control of the machine, for purposes of adjustment. This post 17 is also equipped at its upper extremity with a crank arm 19 which is made fast to the post, the outer extremity of this crank arm being pivotally connected as shown at 20 with a rod 21 whose opposite extremity is pivotally connected as shown at 22 with a bearing 23 mounted on the conduit 5 and longitudinally adjustable thereon in order to regulate the direction of travel of the steering wheel. The frame work of the tractor carries a motor or engine 24 of any suitable construction, preferably of the internal combustion type. As shown in the drawing a pitman 25 actuated by the engine is connected with a crank 26 of a shaft 27, the latter carrying a pulley 28 which is connected by means of a belt 29 with a pulley 30 fast on a shaft 31 equipped with a gear 32 through the medium of which there is a speed reducing gearing connection with the rear wheels of the tractor unit. The gear 32 meshes with a larger gear 34 fast on a shaft 35 and carrying a smaller gear 36 which meshes with a larger gear 37 fast on a shaft 38 and carrying a smaller gear 39 which meshes with a relatively large gear 40 fast on a shaft 41 whose opposite extremities are provided with sprocket wheels 42 which are connected by means of chains 43 with relatively large sprockets 44 mounted on the traction wheels 12.

Should it be desired to increase the speed of the tractor unit, a gear 45 is shifted on the shaft 38, to cause it to mesh with a companion gear 46 of the same size fast on the shaft 41. By virtue of this adjustment, the shaft 41 may be made to rotate at the same speed as the shaft 38 instead of slower as is the case when the gear 39 is in mesh with the relatively large gear 40. The gear 45 is shifted by means of a rod 47 equipped at one extremity with a forked arm 48 which engages a collar 49 fast on the gear 45. It is evident that when the gear 45 is shifted into mesh with the gear 46, the small gear 39 is thrown out of mesh with the gear 40, since the two gears 45 and 39 are mounted on the same hub and slide in unison on their shaft 38. The shaft 38 is journaled at its opposite extremities in stationary bearings 50; while a frame 51 is connected by means of bearings 52 to oscillate on the shaft 38, in order to throw the two pulleys 28 and 30 into or out of frictional engagement as may be desired. The opposite or forward extremity of this frame 51 is equipped with a pin 53 which engages in an elongated opening formed in the extremity 54 of a lever 55 fulcrumed at 56. When the long arm 57 of this lever is moved downwardly, the frame 51 with its gears is raised by virtue of the upward movement of the short arm 58 of the lever. This upward movement of the forward extremity of the oscillatory frame 51, brings the pulley 30 into frictional engagement with the pulley 28, whereby the belt connection between the two pulleys is broken, and the reverse movement is imparted to the chain of gears and the wheels 12 of the tractor, as indicated by the arrows in Fig. 5. Normally or when the machine is traveling forwardly, the pulleys 28 and 30 are disconnected and the gears and traction wheels travel in the direction indicated by the arrows in Fig. 4. When the lever 55 is adjusted to bring the pulleys 28 and 30 into frictional engagement, its long arm 57 is held in place by means of a hook or projection 59 fast on a cross bar 60 of the frame work. The shaft 41 is composed of two members which are connected by suitable differential mechanism 61, to compensate for the variation of the rotation of the wheels 12 and their connections, when traveling around the hydrant. In Fig. 2 the arcs in which the steering wheels 13 of the two tractor units travel are indicated by dotted lines which are designated 62 and 63 respectively.

The conduit 5 carried by the traction units, is equipped with a series of rearwardly extending branch pipes 64 each of which is equipped with a nozzle 65, these nozzles being so spaced that the sprays of water issuing therefrom will mingle. In other words, the nozzles are so arranged as to approximately evenly irrigate the ground over which the machine is traveling when in use.

From the foregoing description the use and operation of my improved irrigating apparatus will be readily understood. Assuming that the valve 9 of the hydrant is so adjusted as to allow the water to enter the conduit 5, the engines or motors 24 of the apparatus are started, and the machine begins to travel over a circular area in which the hydrant is centrally located. In the event that it should be desired to irrigate rectangular areas, a flexible hose (not shown) will be connected with the hydrant at one extremity, and with one end of the conduit 5 at the opposite extremity. The machine could then travel in opposite directions from the hydrant, distances equal or approximately equal to the length of the flexible hose pipe or conduit. Attention is called to the fact that the steering wheels 13 of all the tractor units, are adjusted to travel in arcs struck from the axis of the hydrant pipe, this adjustment being accomplished by the movement of the members 23 longitudinally on the conduit 5, and securing these members 23 in the desired position of adjustment. In this event the steering wheels cannot change their course or direction of travel, but must move in circles according to their adjustment.

In Figs. 6 and 7 the apparatus as illustrated may be used for irrigating areas of rectangular shape. In other words, in Fig. 6 there are two hydrants designated 70 and 71 respectively. When the machine is traveling in the direction indicated by arrow $a$, the hydrant 71 is employed and the hose 72 is connected by a suitable coupling 73 with one extremity of a delivery pipe 74 having two members 75 and 76. The hose 72 is connected with the member 75 of this delivery pipe while another hose 77 is adapted to be connected by a coupling 78 with the member 76 of this pipe. When the machine is traveling in the direction indicated by the arrow $a$, a valve 79 is open allowing the water to flow from the hydrant 71 through the hose 72 and the member 75 of the delivery pipe to the main conduit 5 and thence to a set of nozzles 81 extending rearwardly from and in communication with the conduit 5, the term rear in this case being used with reference to the direction of travel as indicated by the arrow $a$. During this time a valve 80 which controls the passage of water from the hydrant 70 to the main conduit 5, is closed. When the machine is traveling in the opposite direction the valve 79 is closed and the valve 80 is opened allowing the water to flow from the hydrant 70 through the hose 77 to the conduit 5 and thence to a series of nozzles 82.

Attention is called to the fact that the passage of the water to the nozzles 81 is controlled by a series of valves 83, each of which has a crank arm 84 operably connected with a rod or cable 85; while a series of similar valves 86 control the passage of water from the main conduit 5 to the nozzles 82, each of the valves 86 having a crank arm 87. These crank arms 87 are all connected with a rod or cable 88. A lever 89 centrally fulcrumed as shown at 90, has its opposite extremities connected with the cables 85 and 88 as shown at 91 and 92; while the opposite extremities of these cables are connected with the opposite ends of a controlling lever 93 centrally fulcrumed as shown at 94, the points where the cables are connected with this last named lever being designated 95 and 96 respectively. The crank arms 84 and 87 are reversely arranged so that when the lever 93 is adjusted as shown in Fig. 6, the valves 83 are all open and the valves 86 all closed. When this condition exists it is assumed that the machine is traveling in the direction indicated by the arrow $a$. When the machine is traveling in the opposite direction the lever 93 is reversed and the valves 83 will all be closed and the valves 86 all opened.

In practice it is assumed that when one of the hose pipes 72 or 77 is in use, the other one is mounted on the machine until the machine reaches its limit of travel in one direction. As soon as this occurs, the hose pipe which has been in use, is disconnected from its hydrant and mounted on the machine while the other hose pipe is connected with the other hydrant.

Having thus described my invention, what I claim is,—

1. In irrigating apparatus, the combination of a conduit, a source of water supply under pressure connected with the said conduit, tractor units upon which the conduit is mounted transversely thereof, branch pipes communicating with the main conduit and equipped with nozzles suitably spaced for irrigating purposes, motors mounted on the respective tractors and connected in operative relation with the traction wheels of each unit, each tractor being also equipped with a forwardly located steering wheel, and means connected with the conduit for adjusting and locking each steering wheel in position to travel in a predetermined path.

2. In irrigating apparatus, the combination of a conduit, a hydrant in communication with said conduit and a number of tractor units upon which the conduit is supported transversely thereon, each of said units having rearwardly located traction wheels and a forwardly located steering wheel, a motor mounted on each tractor and connected in operative relation with the rear wheels, and means adjustably connected with said conduit for adjusting and locking the steering wheel of each tractor in position to travel in a predetermined path.

3. In irrigating apparatus, the combination of a conduit, a hydrant in communication with said conduit, and a tractor upon which the conduit is supported transversely thereon beyond the hydrant, means for connecting the conduit with the hydrant to permit the travel of the conduit around an area of which the hydrant is the center, the tractor having rearwardly located traction wheels, a motor mounted on the tractor, the tractor having a forwardly located steering wheel, and means connected with the steering wheel and with the conduit for adjusting and locking the latter to travel in a predetermined path.

4. In irrigating apparatus, the combination of a conduit, sources of water supply adapted to be connected with said conduit, a tractor unit upon which the conduit is mounted, two series of branch pipes connected with the conduit and equipped with nozzles suitably spaced, valves located in the pipes of each series, a lever mounted upon the conduit, and an operative connection between it and the said valves for simultaneously opening the passage through one series of pipes and closing the passage through the other series, a motor mounted on the tractor and connected in operative relation with the traction wheels, the tractor being equipped with a forwardly located steering wheel, and means for controlling said steering wheel.

5. In irrigating apparatus, the combination of a conduit, sources of water supply adapted to be connected with said conduit, a tractor unit upon which the conduit is mounted, two series of branch pipes communicating with the conduit and equipped with nozzles suitably spaced, the pipes of each series projecting horizontally from the conduit and being oppositely disposed, valves located in the pipes of each series, a lever mounted upon the conduit, and an operative connection between it and the said valves for simultaneously opening the passage through one series of pipes and closing the passage through the other series, a motor mounted on the tractor and connected in operative relation with the traction wheels, the tractor being equipped with a forwardly located steering wheel, and means for controlling said steering wheel.

6. In irrigating apparatus, the combination of a main conduit, auxiliary conduits mounted upon one extremity of the latter and adapted to be connected with sources of water supply, a tractor unit upon which the main conduit is mounted, two series of branch pipes communicating with the main conduit intermediate its extremities and equipped with nozzles suitably spaced, valves located in the pipes of each series, a lever mounted upon the main conduit, and an operative connection between it and the said valves for simultaneously opening the passage through one series of pipes and closing the passage through the other series, a motor mounted on the tractor and connected in operative relation with the traction wheels, the tractor being equipped with a forwardly located steering wheel, and means for controlling said steering wheel.

In testimony whereof I affix my signature in presence of two witnesses.

JAMES A. NORTON.

Witnesses:
GRACE HUSTON,
A. EBERT O'BRIEN.

Copies of this patent may be obtained for five cents each, by addressing the "Commissioner of Patents, Washington, D. C."